(12) United States Patent
Kim et al.

(10) Patent No.: US 8,617,697 B2
(45) Date of Patent: Dec. 31, 2013

(54) PROTECTIVE FILM

(75) Inventors: Chong Won Kim, Gumi-si (KR); Suk Won Choi, Busan (KR); Si Min Kim, Daegu (KR); Jung-Seok Kim, Anyang-si (KR); Sang-Hyun Baek, Gumi-si (KR)

(73) Assignee: Kolon Industries, Inc., Gwacheon-Si (KR)

( * ) Notice: Subject to any disclaimer, the term of this patent is extended or adjusted under 35 U.S.C. 154(b) by 450 days.

(21) Appl. No.: 12/995,057

(22) PCT Filed: May 27, 2009

(86) PCT No.: PCT/KR2009/002813
§ 371 (c)(1),
(2), (4) Date: Nov. 29, 2010

(87) PCT Pub. No.: WO2009/145565
PCT Pub. Date: Dec. 3, 2009

(65) Prior Publication Data
US 2011/0076475 A1    Mar. 31, 2011

(30) Foreign Application Priority Data

May 29, 2008   (KR) .................. 10-2008-0050017
Oct. 24, 2008  (KR) .................. 10-2008-0104653

(51) Int. Cl.
*B32B 7/12*  (2006.01)
*B32B 5/16*  (2006.01)

(52) U.S. Cl.
USPC ........... 428/213; 428/215; 428/331; 428/480; 428/697; 428/701

(58) Field of Classification Search
None
See application file for complete search history.

(56) References Cited

U.S. PATENT DOCUMENTS

2008/0096013 A1*   4/2008   Nashiki et al. ............... 428/336

FOREIGN PATENT DOCUMENTS

| | | | |
|---|---|---|---|
| JP | 03-063127 | A | 3/1991 |
| JP | 11-066969 | A | 3/1999 |
| JP | 2003-053878 | A | 2/2003 |
| JP | 2004-082613 | A | 3/2004 |
| JP | 2006-189582 | A | 7/2006 |
| JP | 2006-218641 | A | 8/2006 |
| JP | 2007-188880 | A | 7/2007 |
| JP | 2008-021605 | A | 1/2008 |
| JP | 2008-023892 | A | 2/2008 |
| KR | 10-0831497 | B1 | 5/2008 |

OTHER PUBLICATIONS

Machine translation of JP2007-188880. Retrieved Mar. 10, 2013.*
Japanese Patent Office, Japanese Office Action issued in corresponding JP Application No. 2011-511508, dated Jan. 29, 2013.

* cited by examiner

*Primary Examiner* — Prashant J Khatri
(74) *Attorney, Agent, or Firm* — Sughrue Mion, PLLC

(57) ABSTRACT

Provided is a protective film including two or more transparent plastic substrates having a functional coating layer formed thereon and laminated successively by way of an adhesive layer.

12 Claims, 1 Drawing Sheet

PROTECTIVE FILM

The present invention claims priority of Korean Patent Application Nos. 10-2008-0050017 and 10-2008-0104653, filed on May 29, 2008 and Oct. 24, 2008, which are incorporated herein by reference.

BACKGROUND OF THE INVENTION

1. Field of the Invention

The present invention relates to a protective film including transparent plastic substrates having a functional coating layer formed thereon and laminated successively by way of an adhesive layer. The present invention also relates to a protective film for a touch screen type e-book.

2. Description of Related Art

In general, e-paper refers to a display having properties very similar to paper, and is a next-generation display by which writing, deletion and storage of data are performed freely in addition to simple information display.

Based on the principle of e-paper, e-books have been also developed. Such e-books fundamentally include a driving film formed on glass and a protective film for protecting the same.

In addition, as the e-book industry has been developed continuously, it has been required for e-books to have functions of freely writing, deleting and storing data. To facilitate such functions, touch screens have been applied to e-books. The touch screen type e-books require a protective film so that they operate stably and firmly even under a contaminative environment.

Under these circumstances, protective films for e-books or touch screen type e-books are required to have physical properties including impact-cushioning property, humidity resistance and UV resistance. Therefore, there has been a need for developing such protective films.

SUMMARY OF THE INVENTION

An embodiment of the present invention is directed to providing a protective film for e-books having high humidity resistance and excellent UV protectability.

Another embodiment of the present invention is directed to providing a protective film having anti-scratch and anti-glare functions.

Another embodiment of the present invention is directed to providing a protective for touch screen type e-books.

To achieve the object of the present invention, the present invention provides a protective film for e-books, which includes two or more sheets of transparent plastic substrates having a functional coating layer thereon and laminated successively. More particularly, the protective film according to one embodiment of the present invention is characterized by such a laminating sequence that an anti-glare layer is formed on the outermost layer to perform an anti-glare function and to prevent scratch generation. In addition, a first silicon oxide coating layer is faced with and adhered to a second silicon oxide coating layer to improve moisture permeability, thereby providing a protective film suitable for e-books.

Further, the protective film according to another embodiment of the present invention is characterized by its thickness as well as its laminating sequence. Particularly, each layer is controlled to have a specific range of thicknesses so that a protective film having improved moisture permeability is provided. In one example embodiment, the protective film obtained using the laminating sequence and thickness disclosed herein has a moisture permeability of 0.5 g/m²·day or less and UV transmittance of 2.0% or less under the conditions of 38±2° C. and 100% relative humidity (RH).

The protective film disclosed herein has a moisture permeability suitable for e-books, causes little change in electronic ink over time and prevents film aging.

DETAILED DESCRIPTION OF MAIN ELEMENTS

Figure 1:
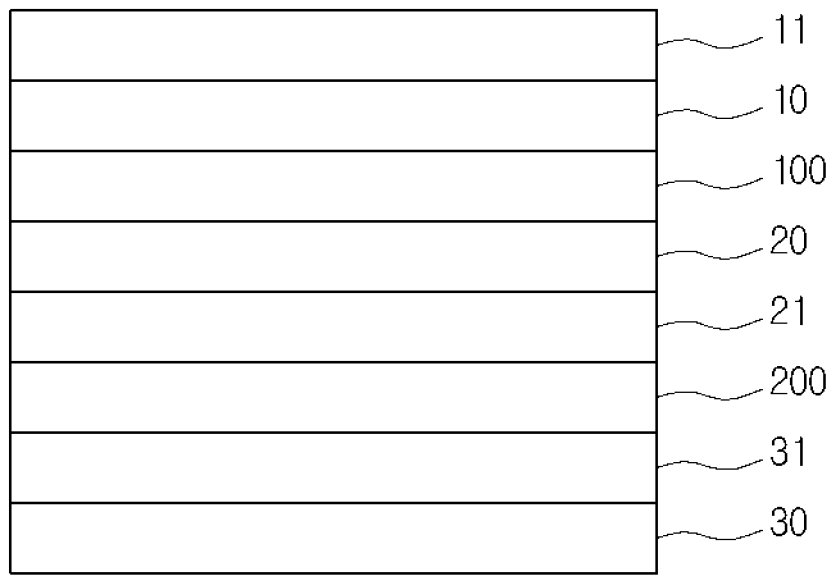
FIG. 1 illustrates one embodiment of the protective film in accordance with the present invention.

10: first transparent plastic substrate
11: anti-glare coating layer
20: second transparent plastic substrate
21: first silicon oxide coating layer
30: third transparent plastic substrate
31: second silicon oxide coating layer
32: conductive coating layer
100: first adhesive layer
200: second adhesive layer

DESCRIPTION OF SPECIFIC EMBODIMENTS

The advantages, features and aspects of the invention will become apparent from the following description of the embodiments with reference to the accompanying drawings, which is set forth hereinafter.

As shown in FIG. 1, the protective film in accordance with one embodiment of the present invention includes a first transparent plastic substrate 10, an anti-glare coating layer 11 formed on one surface of the first transparent plastic substrate, a second transparent plastic substrate 20, a first silicon oxide ($SiO_x$, wherein x is 1.0-2.0) coating layer 21 formed on one surface of the second transparent plastic substrate, a third transparent plastic substrate 30, and a second silicon oxide ($SiO_x$, wherein x is 1.0-2.0) coating layer 31 formed on one surface of the third transparent plastic substrate, wherein the first transparent plastic substrate 10 and the second transparent plastic substrate 20 face each other and are adhered to each other by way of a first adhesive layer 100, and the first silicon oxide coating layer 21 and the second silicon oxide coating layer 31 face each other and are adhered to each other by way of a second adhesive layer 200.

Figure 2:
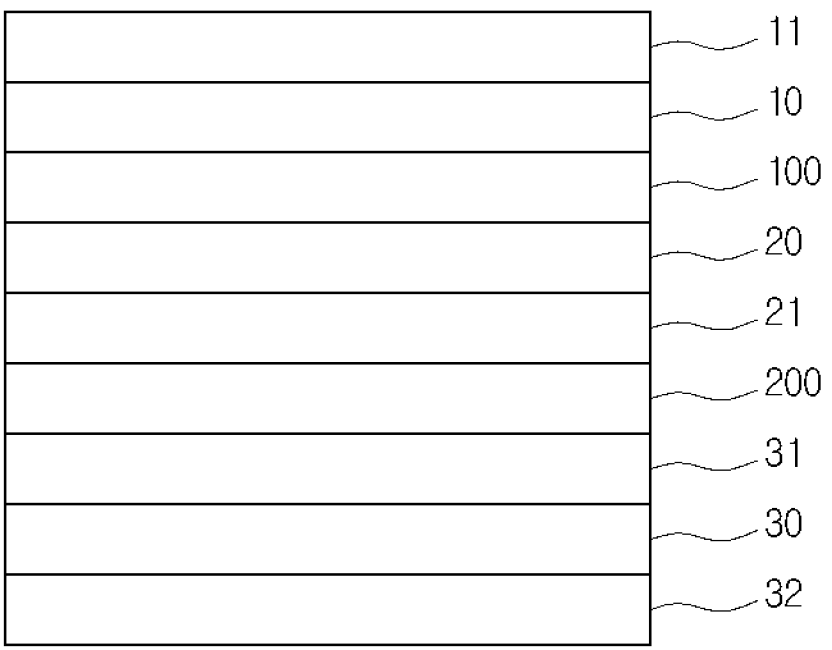
FIG. 2 illustrates another embodiment of the protective film in accordance with the present invention.

As shown in FIG. 2, the protective film in accordance with another embodiment of the present invention further includes a conductive coating layer. More particularly, the protective film includes a first transparent plastic substrate 10, an anti-glare coating layer 11 formed on one surface of the first transparent plastic substrate, a second transparent plastic substrate 20, a first silicon oxide ($SiO_x$, wherein x is 1.0-2.0) coating layer 21 formed on one surface of the second transparent plastic substrate, a third transparent plastic substrate 30, and a second silicon oxide ($SiO_x$, wherein x is 1.0-2.0) coating layer 31 formed on one surface of the third transparent plastic substrate, wherein the first transparent plastic substrate 10 and the second transparent plastic substrate 20 face each other and are adhered to each other by way of a first adhesive layer 100, the first silicon oxide coating layer 21 and the second silicon oxide coating layer 31 face each other and are adhered to each other by way of a second adhesive layer 200, and a conductive coating layer 32 is formed on the third transparent plastic substrate 30. The conductive coating layer 32 may be formed as necessary. The conductive coating layer 32 may be formed from indium tin oxide (ITO) to a coating thickness of 200-1,000 Å via a sputtering, vacuum deposition, ion plating, coating, solution coating or powder coating process.

Hereinafter, particular embodiments of the protective film will be explained in more detail.

In one embodiment, the first transparent plastic substrate 10, the second transparent plastic substrate 20 or the third transparent plastic substrate 30 may include a plastic material having a light transmittance of 90% or higher. For example, polyethylene terephthalate resins, polyethylene naphthalate resins, or the like may be used as the plastic substrates, and oriented versions thereof may also be used.

The first transparent plastic substrate 10 serves as a support for the protective film, and may have a thickness of 50-250 μm, specifically 100-188 μm but is not limited thereto. Such a thickness qualifies the first transparent plastic substrate to serve as a support, prevents damages on outer appearance, and allows the first transparent plastic substrate to maintain flexibility.

The second transparent plastic substrate 20 and the third transparent plastic substrate 30 each serve as a support for the silicon oxide coating layer, and may have a thickness of 10-50 μm, specifically 12-30 μm but are not limited thereto. Such a thickness qualifies the substrates to serve as a support during the oxide deposition process and prevents damages (e.g. wrinkle generation) on outer appearance.

The anti-glare coating layer 11 may include a hard resin, such as an acrylic urethane resin or siloxane resin, in combination with silicone beads, and may have an anti-glare effect and anti-scratch effect. When the anti-glare coating layer 11 is too thin, it shows an insufficient hardness. On the other hand, when the anti-glare coating layer 11 is too thick, cracks may be generated. In addition, the anti-glare coating layer 11 may have a thickness of 3-5 μm to prevent curling.

The first silicon oxide coating layer 21 or the second silicon oxide coating layer 31 may be formed through a vacuum deposition process. The silicon oxide ($SiO_x$, wherein x is 1.0-2.0) coating layer may have low transparency when x is less than 1.0, resulting in a light transmittance of 90% or lower. On the other hand, the silicon oxide coating layer may be cracked when x is greater than 2.0. For these reasons, x may range from 1.0 to 2.0. The silicon oxide coating layer may have a thickness of 300-1,000 Å, specifically 400-800 Å to realize good moisture resistance and a clear color.

The first adhesive layer 100 may be an acrylic resin adhesive composition including a UV protecting agent. The first adhesive layer 100 may have a light transmittance of 90% or higher, a haze of 1% or lower, and a shear storage modulus of $10^3$-$10^5$ Pa. When the adhesive layer has a light transmittance of 90% or lower or a haze of 1% or higher, a display fabricated using the protective film provided with such an adhesive layer may have poor clearness. When the adhesive layer has a shear storage modulus less than $10^3$ Pa, it hinders display assemblage because it protrudes out from an assembled display upon blanking. On the other hand, when the adhesive layer has a shear storage modulus greater than $10^5$ Pa, it shows low adhesive force, resulting in poor durability and weak impact-absorbing property.

In addition, the adhesive composition may further include 0.5-5 parts by weight of a triazole-based UV protecting agent based on 100 parts by weight of the solid content of the resin to ensure UV protectability over a wide range of wavelengths. When the triazole-based UV protecting agent is used in an amount less than 0.5 parts by weight, UV transmittance may rapidly increase after the QUV test, resulting in damages on driving layers of e-books and degradation of response rates. On the other hand, when the triazole-based UV protecting agent is used in an amount greater than 5 parts by weight, it may cause a change in color index after the QUV test. Besides the above UV protecting agent, other trazine-based UV protecting agents, anti-oxidants, thermal stabilizers, fluorescent whitening agents, etc. may be further added, if necessary. These additives may be added in such amounts that they cause no deterioration of physical properties of a coating film. Particularly, they may be added in an amount of 0.5-5 parts by weight based on 100 parts by weight of the solid content of the resin.

The adhesive composition used in the first adhesive layer may further include a crosslinking agent in addition to the acrylic resin. Due to the incorporation of the crosslinking agent, the resin may be crosslinked, thereby improving the heat resistance and water resistance. The crosslinking agent that may be used includes one reactive to the functional groups of the acrylic resin. Particular examples of the crosslinking agent include peroxides, isocyanate-based crosslinking agents, epoxy-based crosslinking agents, metal chelate-based crosslinking agents, melamine-based crosslinking agents, aziridine-based crosslinking agents, metal salts, or the like. Such crosslinking agents may be used alone or in combination. More particularly, isocyanate-based crosslinking agents provide good adhesion. Particular examples of such isocyanate-based crosslinking agents include diisocyanates, such as tolylene diisocyanate, diphenylmethane diisocyanate, xylene diisocyanate, isophorone diisocyanate or hexamethylene diisocyanate, various polyol-modified diisocyanate adducts, polyisocyanate compounds having isocyanurate rings, biuret forms or allophanate forms, or the like. In addition, aliphatic or alicyclic isocyanate compounds may be used as the isocyanate-based crosslinking agents in applications requiring transparency. This is because aromatic isocyanate compounds may cause coloration in the adhesive layer after curing. The crosslinking agent may be used in an amount of 0.01-10.0 parts by weight, particularly 0.05-5.0 parts by weight based on 100 parts by weight of the acrylic adhesive. If the amount of the crosslinking agent is in excess of 10.0 parts by weight, excessive crosslinking may occur to reduce the tackiness after drying and to cause degradation of adhesion after the lamination with a transparent plastic substrate, resulting in poor durability. On the other hand, if the amount of the crosslinking agent is less than 0.01 parts by weight, the adhesive may be cured insufficiently, resulting in degradation of the water resistance.

The first adhesive layer 100 is formed by applying the adhesive composition onto a support, followed by drying. Since the adhesive includes a crosslinking agent, thermal treatment of the adhesive layer enables crosslinking. The crosslinking may be carried out simultaneously with drying at the temperature where the solvent is dried. Otherwise, separate crosslinking operation may be performed after the drying. The adhesive layer may be aged to adjust the crosslinking of the adhesive layer.

In the protective film according to one embodiment of the present invention, the first adhesive layer 100 serves to improve the impact-absorbing property between the first transparent plastic substrate and the second transparent plastic substrate. To facilitate the impact-absorbing function, the first adhesive layer 100 may have a shear storage modulus of $10^3$-$10^5$ Pa.

The second adhesive layer 200 may be a urethane adhesive having excellent adhesion to silicon oxide.

The adhesive composition used in the first adhesive layer or the second adhesive layer may be used in the form of a liquid composition. Particular examples of the solvent that may be used herein include methyl ethyl ketone, acetone, ethyl acetate, tetrahydrofuran, dioxane, cyclohexanone, n-hexane, toluene, xylene, methanol, ethanol, n-propanol, isopropanol, water, etc. Such solvents may be used alone or in combination. The solvent may be the solvent previously used for the polymerization, or at least one solvent other than the polymerization solvent, added to allow uniform application of the adhesive layers.

The conductive coating layer 32 formed on the third transparent plastic substrate 30 imparts conductivity to realize touch screen functions when the protective film is applied to e-books. The conductive coating layer may be formed from indium tin oxide (ITO) via sputtering, vacuum deposition, ion plating, coating, solution coating, powder coating, etc., but is not limited thereto. Particularly, the conductive coating layer may be formed through a sputtering process.

In addition, the conductive coating layer 32 may be formed to a thickness of 200-1,000 Å, particularly 300-800 Å. A conductive coating layer having a thickness of 200-1,000 Å facilitates transfer of electric signals during the operation of a touch screen, and does not deteriorate the transparency to realize good resolution in a finished display during the driving thereof.

The protective film according to various embodiments of the present invention has low moisture permeability, thereby minimizing a change in electronic ink over time when used as a protective film for e-books, and shows a low UV transmittance, thereby preventing deterioration of a driving film.

The examples and experiments will now be described. The following examples and experiments are for illustrative purposes only and not intended to limit the scope of this disclosure.

In the following examples, physical properties of protective films are measured as follows.

1) Water Permeability

Water permeability of a film is measured according to KS M3088:2004 (38±2° C., 100% RH).

Fail: water permeability >0.5
Pass: water permeability ≤0.5

2) UV Transmittance

UV transmittance of a film is measured using Verian, Cary 5000 UV-Visible Spectrophotometer.

UV transmittance (%) before QUV: UV transmittance is measured over the whole ranges of UV wavelengths (200-300 nm), after a protective film is provided, and the anti-glare coating layer of the first transparent plastic is allowed to face the UV light source. The highest UV transmittance value is taken from the measured range.

Fail: UV transmittance >2.0
Pass: UV transmittance ≤2.0

UV transmittance (%) after QUV: the surface of the first transparent plastic substrate is allowed to face the light source in a QUV chamber equipped with a lamp emitting the light with UVB wavelengths after providing the protective film, and then the protective film is allowed to stand for 100 hours. Then, UV transmittance is measured in a UV wavelength range of 200-300 nm using a UV transmittance measuring system. The highest UV transmittance value is taken from the measured range.

Fail: UV transmittance >2.0
Pass: UV transmittance ≤2.0

3) Shear Storage Modulus

The adhesive composition used for producing the protective film is dissolved into a solvent, the resultant solution is applied to a Teflon sheet through a solvent casting process, and the solvent is allowed to evaporate to obtain a 1 mm-thickness film having only the adhesive layer. The adhesive film is loaded in the middle of a fixed lower plate and a rotatable upper plate using a rheometer (Rheometrics, RMS), and variations in the shear force are measured depending on frequency (moving angle of the upper plate per unit time). Herein, data are obtained under a strain of 5% over a range of 1-100 radian/sec, and the storage modulus value at 10 radian/sec is taken as the reference value.

4) Coating Thickness

A thickness measuring device is used to measure the thickness of a coating layer.

5) Appearance

Film appearance is determined by the naked eye. A film that shows no specific feature is evaluated as 'pass', and a film having wrinkles is evaluated as 'fail'.

6) Light Transmittance of Protective Film

Light transmittance is taken as the total transmittance measured by 300A model available from Nippon Denshoku Co. A protective film having a light transmittance of 88% or higher is evaluated as 'excellent', a protective film having a light transmittance of 60-88% is evaluated as 'good', and a protective film having a light transmittance less than 60% is evaluated as 'poor'.

Example 1

Fabrication of First Transparent Plastic Substrate Having Anti-Glare Coating Layer A polyethylene terephthalate film (H11F available from Kolon) having a thickness of 188 μm and a width of 1,000 mm is provided. Next, 5 parts by weight of silica beads (Shinetsu Chemical, X-52-854) are added to and mixed with 100 parts by weight of an acrylic urethane resin (DAI NIPPON PRINTING, UNIDIK 17-824-9) to provide a composition for an anti-glare layer. The composition is applied to one surface of the polyethylene terephthalate film, dried at 100° C. for 3 minutes, and irradiated immediately with UV rays using two ozone type high-pressure mercury lamps (80 W/cm, 15 cm light collection type). In this manner, an anti-glare layer having a thickness of 5 μm is formed.

Fabrication of Second Transparent Plastic Substrate Having First Silicon Oxide Coating Layer A $SiO_{1.5}$ coating layer having a thickness of 500 Å is formed onto a polyethylene terephthalate film (Kolon, FQ00) having a thickness of 12 μm and a width of 1,000 mm via a vacuum deposition process.

Fabrication of Third Transparent Plastic Substrate Having Second Silicon Oxide Deposition Layer A $SiO_{1.5}$ coating layer having a thickness of 500 Å is formed onto a polyethylene terephthalate film (Kolon, FQ00) having a thickness of 12 μm and a width of 1,000 mm via a vacuum deposition process.

Preparation of First Adhesive Composition

First, 0.3 parts by weight of an isocyanate crosslinking agent (Soken Chemistry, E-AX) is added to 100 parts by weight (solid content basis) of an acrylate adhesive (Soken Chemistry, SK2094R). Next, the resultant mixture is further mixed with 1 part by weight of benzotriazole (Ciba, Tinuvin 1130) as a UV protecting agent and methyl ethyl ketone is added thereto to a solid content of 20% in the resultant solution, thereby providing an adhesive composition.

Preparation of Second Adhesive Composition

First, 20 parts by weight of an isocyanate crosslinking agent (Kangnam Chemistry, Co. Ltd., CL 100) is added to 100 parts by weight (solid content basis) of a polyurethane resin (Kangnam Chemistry, Co. Ltd., Neoforce 338). Next, the resultant mixture is diluted with toluene as a solvent to provide a solution with a solid content of 10%.

Fabrication of Protective Film

As shown in FIG. 1, the second transparent plastic substrate having the first silicon oxide coating layer and the third transparent plastic substrate having the second silicon oxide coating layer are adhered to each other using the second adhesive composition. Then, the resultant laminate is adhered with the first transparent plastic substrate having the anti-glare layer using the first adhesive composition.

More particularly, the second adhesive composition is coated onto the surface of the second transparent plastic substrate, where the first silicon oxide coating layer is formed, and dried at 100° C. for 2 minutes to form a second adhesive layer having a dry coating thickness of 3 μm. Then, the second silicon oxide coating layer of the third transparent plastic substrate is adhered to the second adhesive layer.

Then, the first adhesive composition is coated onto the surface of the second transparent plastic substrate having no first silicon oxide coating layer, and dried at 100° C. for 3 minutes to form a first adhesive coating layer having a thickness of 50 μm. After that, the surface of the first transparent plastic substrate having no anti-glare layer is adhered thereto.

The protective film obtained as described above is determined for its physical properties, and the results are shown in Table 1.

Example 2

Example 1 is repeated to provide a protective film, except that 2 parts by weight of an anti-oxidant (Ciba, Irganox 1010) is further added during the preparation of the first adhesive composition in Example 1. The protective film obtained as described above is determined for its physical properties, and the results are shown in Table 1.

Example 3

Example 1 is repeated to provide a protective film, except that a conductive coating layer is additionally formed as shown in FIG. 2.

More particularly, indium tin oxide (ITO) is coated onto the surface of the third transparent plastic substrate having no second silicon oxide coating layer in the protective film according to Example 1 through a sputtering process to a thickness of 500 Å to form the conductive coating layer. The protective film is determined for its physical properties, and the results are shown in Table 1.

Example 4

Example 3 is repeated to provide a protective film, except that 2 parts by weight of an anti-oxidant (Ciba, Irganox 1010) is further added during the preparation of the first adhesive composition in Example 3. The protective film is determined for its physical properties, and the results are shown in Table 1.

Example 5

Example 3 is repeated to provide a protective film, except that ITO is coated to a thickness of 100 Å. The protective film is determined for its physical properties, and the results are shown in Table 1.

Example 6

Example 3 is repeated to provide a protective film, except that ITO is coated to a thickness of 1,500 Å. The protective film is determined for its physical properties, and the results are shown in Table 1.

Comparative Example 1

Example 1 is repeated to provide a protective film, except that neither the first silicon oxide coating layer nor the second silicon oxide coating layer is used. The protective film is determined for its physical properties, and the results are shown in Table 1.

Comparative Example 2

Example 1 is repeated to provide a protective film, except that aluminum oxide ($Al_2O_3$) is deposited onto the second transparent plastic substrate. The protective film is determined for its physical properties, and the results are shown in Table 1.

Comparative Example 3

Example 3 is repeated to provide a protective film, except that neither the first silicon oxide coating layer nor the second silicon oxide coating layer is used. The protective film is determined for its physical properties, and the results are shown in Table 1.

Comparative Example 4

Example 3 is repeated to provide a protective film, except that aluminum oxide ($Al_2O_3$) is deposited onto the second transparent plastic substrate. The protective film is determined for its physical properties, and the results are shown in Table 1.

TABLE 1

|  | Moisture permeability ($g/m^2 \cdot day$) | UV transmittance before QUV (max. %) | UV transmittance after QUV (max. %) | Appearance | Light transmittance of Protective film (%) |
|---|---|---|---|---|---|
| Ex. 1 | ≤0.1 | 1.0 ± 0.2 | 1.5 ± 0.2 | Excellent | Excellent |
| Ex. 2 | ≤0.1 | 1.0 ± 0.2 | 1.2 ± 0.2 | Excellent | Excellent |
| Ex. 3 | ≤0.04 | 0.9 ± 0.2 | 1.5 ± 0.2 | Excellent | Excellent |
| Ex. 4 | ≤0.03 | 0.8 ± 0.2 | 1.2 ± 0.2 | Excellent | Excellent |
| Ex. 5 | ≤0.05 | 1.1 ± 0.2 | 1.8 ± 0.2 | Excellent | Excellent |
| Ex. 6 | ≤0.05 | 1.0 ± 0.2 | 1.6 ± 0.2 | Excellent | Good |
| Comp. Ex. 1 | 2.5 ± 0.5 | 1.0 ± 0.2 | 1.7 ± 0.2 | Excellent | Excellent |
| Comp. Ex. 2 | 0.8 ± 0.2 | 1.0 ± 0.2 | 1.6 ± 0.2 | Excellent | Excellent |
| Comp. Ex. 3 | 1.9 ± 0.3 | 1.0 ± 0.2 | 1.6 ± 0.2 | Excellent | Excellent |
| Comp. Ex. 4 | 0.7 ± 0.2 | 0.9 ± 0.2 | 1.7 ± 0.2 | Excellent | Excellent |

As can be seen from the results of Table 1, the protective films according to Examples 1-6 have low moisture permeability, thereby realizing higher barrier property against water steam. In addition, in the case of Example 2, it can be seen that addition of an anti-oxidant to the first adhesive composition further reduces the UV transmittance. Further, the presence of a conductive layer realizes a touch screen and improves the moisture permeability, UV transmittance and light transmittance.

However, Comparative Examples having no silicon oxide layer show a rapid increase in moisture permeability. In addition, a transparent deposition layer formed of aluminum oxide provides higher moisture permeability as compared to a silicon oxide layer.

Therefore, it can be seen from the above results that the protective film having the lamination sequence and thickness disclosed herein shows excellent barrier property against water steam and high UV protectability, and thus may be useful as a protective film for e-books or the like.

The protective film disclosed herein may be applied not only to e-books but also to various uses, including household electronic appliances, cars, communication instruments, display devices, such as PDA, or the like.

In addition, the protective film disclosed herein may be applied to touch screen type e-books.

While the present invention has been described with respect to the specific embodiments, it will be apparent to those skilled in the art that various changes and modifications may be made without departing from the spirit and scope of the invention as defined in the following claims.

What is claimed is:

1. A protective film, comprising:
   a first transparent plastic substrate;
   an anti-glare coating layer formed on one surface of the first transparent substrate;
   a second transparent plastic substrate;
   a first silicon oxide $SiO_x$ coating layer formed on one surface of the second transparent plastic substrate wherein x is 1.0-2.0;
   a third transparent plastic substrate; and
   a second silicon oxide $SiO_x$ coating layer formed on one surface of the third transparent plastic substrate wherein x is 1.0-2.0,
   wherein the first transparent plastic substrate and the second transparent plastic substrate face each other and are adhered to each other by way of a first adhesive layer, and the first silicon oxide coating layer and the second silicon oxide coating layer face each other and are adhered to each other by way of a second adhesive layer.

2. The protective film according to claim 1, which further comprises a conductive coating layer on the top of the third transparent plastic substrate.

3. The protective film according to claim 2, wherein the conductive coating layer is formed by coating indium tin oxide (ITO) to a thickness of 200-1,000 Å through a sputtering, vacuum deposition, ion plating, coating, solution coating or powder coating process.

4. The protective film according to claim 1, wherein the first silicon oxide coating layer or the second silicon oxide coating layer is coated to a thickness of 300-1,000 Å via vacuum deposition.

5. The protective film according to claim 1, wherein the anti-glare coating layer is coated to a dry coating thickness of 3-5 μm using a composition containing a urethane acrylate resin to which silicone beads are added.

6. The protective film according to claim 1, wherein the first adhesive layer is coated to a dry coating thickness of 30-60 μm using an acrylic adhesive composition containing a UV protecting agent.

7. The protective film according to claim 6, wherein the first adhesive layer has a light transmittance of 90% or higher, a haze of 1% or less, and a shear storage modulus of $10^3$-$10^5$ Pa.

8. The protective film according to claim 7, wherein the adhesive composition comprises a triazole-based UV protecting agent.

9. The protective film according to claim 8, wherein the adhesive composition further comprises at least one additive selected from a triazine-based UV protecting agent, an anti-oxidant, a thermal stabilizer and a fluorescence whitening agent.

10. The protective film according to claim 1, wherein the second adhesive layer is coated to a dry coating thickness of 1-10 μm using a urethane-based adhesive composition.

11. The protective film according to claim 1, wherein the first transparent plastic substrate has a thickness of 50-250 μm, the second transparent plastic substrate has a thickness of 10-50 μm, and the third transparent plastic substrate has a thickness of 10-50 μm.

12. The protective film according to claim 11, wherein the first transparent plastic substrate, the second transparent plastic substrate or the third transparent plastic substrate includes polyethylene terephthalate or polyethylene naphthalate having a light transmittance of 90% or higher.

* * * * *